UNITED STATES PATENT OFFICE

W. DEWEES WOOD, OF McKEESPORT, PENNSYLVANIA.

IMPROVEMENT IN THE MANUFACTURE OF SHEET-IRON.

Specification forming part of Letters Patent No. 137,585, dated April 8, 1873; reissue No. 5,474, dated July 1, 1873; application filed June 18, 1873.

*To all whom it may concern:*

Be it known that I, W. DEWEES WOOD, of McKeesport, in the county of Allegheny and State of Pennsylvania, have invented a new and useful Improvement in Manufacturing Sheet-Iron; and I do hereby declare the following to be a full, clear, and exact description thereof.

My invention consists in the mode of finishing sheet-iron by, first, securing a non-oxidizable surface, in the manner hereinafter set forth; second, rolling and annealing; and, third, hammering in packs while cold.

To enable others skilled in the art to make and use my invention, I will proceed to describe the same.

The iron, after being broken down into sheets by rolling, is cleaned of its scale by acid and alkaline baths, and washed with hot water in the manner usually practiced in the art, or the scale may be removed by other suitable process. The sheets are then immediately placed in a hot-air oven and thoroughly dried; and, while still warm and free from rust, they are plunged into a bath of graphite and oil, or an equivalent mixture of carbonaceous matter ground in oil, of suitable consistency for coating the sheets therewith. The sheets are then rolled in packs of three or more at a good rolling-heat. After they are trimmed and annealed, I arrange them in packs of, say, from ten to one hundred, more or less, and, while cold, subject such packs to the operation of hammering over their entire surface. With a system of hammers operating at the rate of, say, twenty to forty blows per minute, a medium-sized pack can be ordinarily hammered sufficiently in about ten minutes, more or less, so as to impart to the sheets a polished surface superior to that of the best Russia sheet-iron.

The graphite and oil may be applied separately, if so desired.

What I claim as my invention, and desire to secure by Letters Patent, is—

In the process of finishing sheet-iron, the combination of the following steps: First, coating the sheets separately with a mixture of graphite, or other carbonaceous matter ground in oil; second, rolling and annealing; and, third, hammering in packs while cold, substantially as set forth.

In witness whereof I, the said W. DEWEES WOOD, have hereunto set my hand.

W. DEWEES WOOD.

Witnesses:

F. STANDISH,

T. B. KERR.